United States Patent Office 3,751,561
Patented Aug. 7, 1973

3,751,561
STABLE POLYMER-ENZYME ORAL HYGIENE COMPOSITIONS
Bernard S. Wildi, Kirkwood, Thomas L. Westman, St. Louis, and Leonard Keay, Florissant, Mo., assignors to Monsanto Company, St. Louis, Mo.
No Drawing. Continuation-in-part of application Ser. No. 763,341, Sept. 27, 1968. This application Nov. 23, 1970, Ser. No. 92,218
Int. Cl. A61k 7/16
U.S. Cl. 424—48
20 Claims

ABSTRACT OF THE DISCLOSURE

Oral hygiene compositions, comprising polymer-enzyme products wherein the enzyme is covalently bound, having protease activity within the pH range of the oral cavity, and such compositions comprising a plurality of polymer-enzyme products or a polymer-plural enzyme product, whereby the range of effective enzymatic activity is extended. The compositions are stable, long-acting in use, substantive to the teeth, and not readily subject to denaturation of the enzymatic component thereof even upon long storage. The polymer-enzyme products employed are tailored to be effective at the normal relatively neutral pH range of the oral cavity. One especially preferred composition for dental use comprises a polymer-enzyme product wherein both neutral protease and dextranase are covalently bound. Method of using such polymer-enzyme products in oral hygiene.

CROSS-REFERENCE TO RELATED APPLICATIONS

This application is a continuation-in-part of copending application U.S. Ser. No. 763,341, filed on Sept. 27, 1968, now abandoned.

BACKGROUND OF THE INVENTION (1) Field of invention: Oral and dental hygiene

Enzymatically-active oral hygiene, including dental, compositions.

(2) Prior art

The effectiveness of enzymes in oral hygiene has been recognized for a considerable period. Reference is made to representative U.S. Pats. 1,135,250; 1,386,252; 1,460,179 and 3,194,738. However, the instability of enzymes upon storage in oral hygiene compositions, especially of an aqueous nature, as well as upon entry into the oral cavity, is also well established. Especially when in the form of pastes or liquid products such as mouthwashes or gargles, the reduced enzymatic activity after long periods of storage, together with rapid inactivation in the oral cavity, has been a salient disadvantage of enzyme-containing oral hygiene compositions.

Further, although it is known that deposits on teeth and elsewhere in the oral cavity contain bacteria, proteins, polysaccharides, such as dextrans, and dried salivary mucoproteins, for which reason a combination of enzymes in an oral hygiene composition, each capable of degrading some component in this combination, would be of advantage, e.g., proteases, carbohydrates, e.g., dextranases and levanases, bacteriolytic enzymes, e.g., lysozyme, etc., such mixtures of enzymes are known to be especially susceptible to autogenous denaturation due to attack by one enzyme upon another, especially when they are obtained from different sources (several enzymes obtained from a single source sometimes having an enhanced degree of stability against attack by other enzymes from the same source). This autogenous denaturation is especially critical when alkaline protease is present, as it often is, whether intentionally or as a contaminant of other enzymes, since it is removed only with difficulty from mixtures with other enzymes. It is therefore frequently present together with other enzymes, even though it is not especially desirable as a component of oral hygiene compositions because it does not have its optimum enzymatic effectiveness in the relatively neutral pH range of the oral cavity. For such reasons, it has heretofore been impossible to market effective mixtures of enzymes themselves in oral hygiene combinations.

In addition to attack by one enzyme upon another, it is established that some enzymes are subject to autolysis because of attack by one portion of the molecule upon another, especially under suitable conditions, such as presence in an aqueous environment. As an example of the instability of enzymes in oral hygiene compositions, dextranase is stable for only a few hours and apparently loses all of its activity at room temperature in a period of approximately only 3 days.

For all of the foregoing reasons, it is obvious that, although enzymes have been employed in oral hygiene compositions with some measure of success, the inherent instability of the enzymes themselves, especially in aqueous environments such as characterize many oral compositions, detracts greatly from their effectiveness and from the duration of their activity. Such compositions characterized by inherent instability, which reduces their shelf life greatly, and introduces odor and indefiniteness as to degree of activity remaining at time of use, obviously leave much to be desired in such enzymatically-active oral hygiene compositions. Such problems of inadequate stability and shelf life are, as pointed out, at a maximum when combinations of enzymes are employed in oral hygiene compositions, for which reasons combinations of enzymes in oral hygiene compositions have been avoided. In addition, it should be mentioned that, due to the relatively neutral pH range of the oral cavity, that is, between about 5 and 9, and preferably between about 6 and 8, certain enzymes having their activity or optimum activity outside of the pH range of the oral cavity have been excluded from effective use in such oral hygiene compositions. If they have been present, they have not been active or optimally active at the pH range of the oral cavity.

It is apparent that new and improved enzymatically-active oral hygiene compositions would be highly desirable, especially such as would have improved substantivity to the teeth, improved color, stability, lack of odor, and adequate periods of shelf life [particularly when in the form of aqueous compositions], which would allow a combination of enzymatic activities without autogenous denaturation of one enzyme by another, or even of a single enzyme by itself, and which would moreover permit the employment of additional enzymatic activities in the oral hygiene composition even though the activity or optimum activity pH range of the native enzyme itself is outside of the relatively neutral pH range of the oral cavity.

SUMMARY OF THE INVENTION

The present invention provides new and improved oral hygiene compositions, having increased stability and greatly increased shelf life, which comprise, as an enzymatically-active component thereof, at least one polymer-enzyme product which is enzymatically-active within the relatively neutral pH range of the oral cavity. Preferably, such compositions comprise either a plurality of polymer-enzyme products, or a polymer-plural enzyme product, in which more than one enzymatic-activity is present. In any case, the enzyme or enzymes are covalently bound into the polymer molecule. This eliminates the likelihood of contamination by free enzyme, with all of the attendant disadvantages already noted in the foregoing, due to reversibility of the reaction by which the polymer-enzyme products are formed. The polymer-enzyme product may be present in either water-soluble or water-insoluble form depending upon the composition involved and the exact purpose for which it is to be employed. Insoluble polymer-enzyme products can advantageously be used for toothpastes and other dentifrices and solid products where clarity of a solution is not involved, although water-soluble polymer-enzyme products can also be used in such compositions and have the advantage of more intimate contact with the substrate and enhanced substantivity to the teeth, which it is desired to effect by treatment with the oral hygiene composition. When the composition is marketed in a clear solution form, soluble polymer-enzyme products will be the ingredient of choice, again having the desirable characteristics of maximum contact with substrate but also permitting a clear and sparkling solution without sedimentation, an aspect of importance from a marketing standpoint if not from the standpoint of operativeness.

The invention involves such compositions containing a polymer-enzyme product wherein the enzyme is covalently bound and having protease activity within the relatively neutral pH range of the oral cavity, and a further preferred embodiment involves the presence of a polymer-enzyme product wherein the enzyme is a neutral protease, either together with another polymer-enzyme product containing a different enzyme, for example dextranase, lysozyme, or together with such other enzyme or enzymes in a polymer-plural enzyme product. The stability of such polymer-plural enzyme products is materially enhanced. Also, in this manner a plurality of enzymatic activities can be present in the oral hygiene composition which has very good shelf life. In addition, because of the polyelectrolytic nature of the polymer molecule, the pH active or optimally active range for various enzymes can be altered, downwardly by employment of a cationic polyelectrolyte as the polymer portion of the polymer-enzyme product, or upwardly, as by means of an anionic polyelectrolyte, thus making available additional enzymes for effective incorporation into oral hygiene compositions for use within the relatively neutral pH ranges of the oral cavity, which enzymes were previously not active within these ranges or only minimally so, but which as so altered have activity or optimum activity within the required pH range for oral employment. The preparation and use of such compositions of the invention and the enzymatically-active ingredient thereof in oral hygiene are also within the purview of the invention.

OBJECTS

One object of the invention is to provide new and improved oral hygiene compositions containing polymer-enzyme products or combinations thereof; or polymer-plural enzyme products, both soluble and insoluble in nature, which compositions are more stable, long-acting, less subject to deterioration, and which have a longer shelf life and longer period of effectiveness upon use and which are not subject to autogenous destruction or deterioration. Another object of the invention involves the provision of such compositions wherein one enzyme moiety of a polymer-enzyme component is a neutral protease, preferably in combination with another differently active enzyme, for example, dextranase, whether this additional enzymatic component be present in a different polymer-enzyme molecule or in the same molecule as the neutral protease. A further object of the invention involves provision of such compositions containing polymer-enzyme products which are effective within the relatively neutral pH range of the oral cavity, or optimally within this range, whereas the native enzymes incorporated as the enzyme moiety of the polymer-enzyme products of such compositions is either not active or not optimally active within such pH range. A still further object of the invention is to provide a method of producing such compositions and a still additional object is to provide a method of employing such compositions and the enzymatically-active component thereof in oral hygiene. Other objects of the invention will become apparent hereinafter, and still other objects will be obvious to one skilled in the art.

GENERAL DESCRIPTION OF THE INVENTION

The invention, then, involves oral hygiene compositions, comprising as an active component thereof at least one polymer-enzyme product wherein the enzyme is covalently bound. A plurality of enzymatic activities may be present in the form of a plurality of polymer-enzyme products. Such compositions have the advantage that the enzymatically-active component or components are inherently much more stable by the nature of the polymer-enzyme molecule and further because one enzyme does not digest itself or another enzyme and thereby destroy the activity of the composition, since the various enzyme moieties are involved in different environments. Even a greater improvement is realized when a plurality of enzymes are attached to the same polymer molecule. Thus, in this manner, are provided oral hygiene compositions containing either a single enzyme-polymer product or a plurality of enzyme-polymer products or a polymer-plural enzyme product, or combinations thereof, all of which are enzymatically active, which are exceedingly more stable and long acting in use and less susceptible to deterioration while in storage because the enzymatic components thereof are not subject to destruction by the same or a different enzymatic component of the composition. For example, if one or more of the enzymes present in an ordinary oral hygiene composition should be a protease, it will attack other protease molecules, dextranase molecules, amylase, or the like; an alkaline protease will attack neutral protease molecules, when both are present; and neutral protease molecules may even attack and digest each other. Such autogenous diminution of enzymatic-activity is not a characteristic of the compositions of the present invention.

Moreover, since some enzymes have a pH activity or a pH optimum activity in a range unsuitable for oral use, for example, dextranase has a pH optimum of 4–5, they are either inactive or only marginally active when used in oral hygiene, since obviously the compositions employed will not (and can not from the standpoint of being orally pharmacologically acceptable) be made strongly acid or basic merely to accommodate the activity or optimum activity range of an enzymatically-active component. When present covalently bound in an anionic polymer molecule, the pH optimum activity is generally substantially increased, and when bound into a cationic polymer, the pH optimum activity of the enzyme is generally substantially decreased, so that according to the invention oral hygiene compositions having enzymatically-active components which are active or optimally active within the relatively neutral pH ranges of the oral cavity are now possible which were heretofore impossible (due to the fact that the native enzyme was either inactive or only marginally active within such pH range). For example, EMA-dextranase, one of the polymer-enzyme products which may be employed according to the invention, has its pH optimum ativity substantially higher than dextranase itself. In addition, as previously pointed out, innumerable combinations of enzymatic activities can now be embodied into oral hygiene compositions, in the form of water-insoluble or water-soluble materials, each being enzymatically-active and independently capable of degrading components which attach themselves to surfaces of the oral cavity and invite infection or bacterial infestation resulting in tooth decay and other undesirable oral health problems.

The oral hygiene compositions of the invention are formulated in conventional manner with the exception that they include as enzymatically-active component the selected polymer-enzyme product, and advantageously a mixture of such products or a polymer-plural enzyme product, or combinations thereof. Such may be employed in water-soluble or water-insoluble form, as already indicated, depending upon the specific composition and its intended use. Application or use is by contacting an enzymatically-effective amount of such composition, or the enzymatically-active component thereof which is active at the relatively neutral pH range of the oral cavity, either alone or together with a suitable carrier, binder, or like material or composition, with the oral cavity or a selected portion thereof, and of course maintaining such contact for a period sufficient to enable the polymer-enzymatic material to exert its desired enzymatic effect on the substrate digested thereby.

Polymer-enzyme products

According to the present invention, the oral hygiene compositions provided are characterized by the presence of a polymer-enzyme product, preferably a plurality of different polymer-enzyme products, or a polymer-plural enzyme product comprising a plurality of enzymes bound therein, or mixtures of the same. The polymer-enzyme product may be either water-soluble or water-insoluble, but in any event the enzymes are covalently bound to the polymer molecule. Such enzyme-polymer product may, for example, advantageously include a polymer-neutral protease product or such a product together with a polymer-dextranase product, or it may include a single polymer having both a neutral protease and dextranase bound covalently therein, or mixtures of the various types of polymer-enzyme products.

The polymer employed is preferably one containing a free carboxyl or carboxylic anhydride group adapted to effect covalent bonding with the enzyme either directly or through activation of a carboxyl group thereof. The polymer may be of relatively low molecular weight and noncrosslinked when water-soluble products are desired, or it may be of higher molecular weight and itself water insoluble where a water-insoluble polymer-enzyme product is desired. As will be obvious, these different types of products will have their own specific preferred areas of application in the oral hygiene filed. In any case, they are relatively stable and long-acting in effect.

Definitions

"EMA" is a polymer of ethylene and maleic anhydride. Polymers of this type are of great value according to the present invention.

"EMA type" polymer is defined hereinafter.

"EMA-enzyme" or "EMA/enzyme" is a copolymer of ethylene and maleic anhydride having enzyme covalently bonded thereto. The product is the same whether the enzyme is reacted directly with an anhydride group of the ethylene-maleic anhydride copolymer or with a carboxyl group of the ethylene-maleic anhydride copolymer, whether or not using an intermediate activating mechanism for carboxyl groups of the polymer. Anhydride groups not participating in the reaction by which the product is produced in aqueous medium are present in the product as carboxyl or carboxylate groups. Such nonparticipating groups may, however, be converted to amide, imide, ester, etc., groups, as can be present in EMA-type polymers, as hereinafter defined.

"Water-insoluble" means that the product concerned does not dissolve in water or aqueous solutions, although it may have such characteristics as a high degree of swelling due to water solvation, even to the extent of existence in gel form.

"Water-soluble" means not water-insoluble, and is further defined hereinafter.

Polymer-enzyme derivatives can be prepared by reacting the crystalline or crude enzyme or enzyme mixture with the polymer in solution, resulting in formation of a polymeric product in which the enzyme is covalently bound.

The reaction of the polymer with a plurality of enzymes, as in some of the preparations, can obviously be carried out stepwise, one enzyme at a time, with or without intermediate isolation, or with all enzymes at once. The latter procedure is preferred for reasons of time, convenience and economy.

When an anhydride or carboxyl is present in the polymer, e.g., an EMA-type polymer, covalent bonding of the enzyme to the polymer may be effected directly through reaction or coupling with an anhydride group or with a carboxyl group using an activating agent. The product is the same in both cases. The pH range for the reaction depends on the enzymes employed and their stability ranges. It is usually about 5 to 9.5, preferably about 6–8, but adjustment must be made for individual cases. Isolation and purification is generally effected according to normal biochemical procedures, and by the general procedure of the examples which follow. Since covalent bonding of the enzyme to the polymer is desired, the reaction is ordinarily carried out at low temperatures and at relatively neutral pH's, in water or dilute aqueous buffer as solvent.

When carried out in this manner, the results are production of the desired active polymer-enzyme derivative, but degree of activity imparted to the polymeric product is sometimes lower than desired, possibly due to partial inactivation of the enzyme during the process. Resort may frequently advantageously be had to employment of a mixed solvent system, using a solvent in which the enzyme is at least partially soluble, usually in an amount up to about 50% by volume. Dimethylsulfoxide (DMSO) is especially suitable as solvent together with water or aqueous buffer solution in a mixed solvent system. Using such a mixed solvent system, the desired active polymer-enzyme product is ordinarily obtained in higher yields and conversions to desirably active product, and introduction of desirably high amounts of enzyme activity into the polymer molecule is generally less difficult.

As far as the polymer in such reaction, it preferably contains carboxyl or anyhdride linkages, especially where the enzyme contains an amino, hydroxyl (including phenolic hydroxyl), or sulfhydryl group not essential for its enzymatic activity. Whene the enzyme contains a carboxyl group not essential for activity, the polymer can contain free hydroxyl or amine groups for reaction therewith. The polymer is preferably EMA or an EMA-type polymer, but it can be any of those types previously disclosed for coupling or reaction with an enzyme, and in any event it is adapted to effect covalent bonding with the enzyme to produce an enzyme-polymer product either directly or indirectly using an activating agent. Inasmuch as the enzymatic activity of the starting enzyme is desired to be retained in the final product, it is of course firstly necessary that bonding of the enzyme to the polymer be through a group which will not result in inactivation of an active site in the enzyme molecule. Among the various reactive groups of enzyme molecules may be mentioned, beside amino and sulfhydryl, also hydroxyl (including phenolic hydroxyl), carboxyl and imidazolyl. Such groups are present in free or unbound form in inactive portions of enzyme molecules, as in a lysine, cysteine, serine, threonine, histidine, or tyrosine moiety of an enzyme molecule, where the particular moiety in question is not considered essential for enzymatic activity, either catalytic in nature or for substrate binding. Therefore, attachment to the polymer molecule is through reaction of the polymer with such groups so as to avoid inactivation of the enzyme during attachment to the polymer molecule. Generally the linkage is an amide, imide, ester, thioester, or disulfide group, such as formed by the carboxyl or anhydride of the polymer with an amine or hydroxyl group in a nonessential moiety of the enzyme protein chain. Amides are conveniently formed by reacting pendant amino groups of the enzyme with carboxylic anhydride groups on the carrier polymer in water, in aqueous buffer media, or in mixed solvents. Amides, imides and esters are readily formed by activating carboxyl groups of the polymer, or alternatively pendant carboxyls of the enzyme, and reacting them with respective hydroxyl, amine or mercaptan groups on the other reactant. Such activation may be effected using various carbodiimides, carboidiimidazoles, Woodward's or Sheehan's reagent, or the like, to form highly active intermediates capable of reacting with other groups mentioned above under mild conditions, the latter favoring retention of enzymatic activity.

The polymer selected for such reaction can therefore be said to be adapted to couple or react with the enzyme, either directly or indirectly through use of an activating agent, as already indicated, and in any event to effect covalent bonding with the enzyme. The attachment procedures given are conducted by techniques adapted to include any requisite protection for the enzyme, which may include a reversible blocking of the enzymatically active site or sites, as for example in the case of papain, where mercuripapain or zinc papain may be employed as an intermediate for reaction with the polymer in order to effect greater yields upon attachment, the protecting atoms being removed subsequent to the attachment reaction.

Enzymes

The enzyme starting material may be obtained from any suitable source, whether vegetable, animal or microbial. Many are available commercially. In addition to the preferred polymer-neutral protease product, another differently active polymer-enzyme product is also preferred for maximum operative enzymatic-activity. Another protease or a carbohydrase e.g., dextranase, levanase, may advantageously be present in the same or in another simultaneously employed polymer-enzyme product. When a polymer-acid protease or other acid-acting enzyme is employed, the polymer is modified and is anionic in nature to raise the pH activity and optimum activity range. This preferably also applies to polymer-pepsin and polymer dextranase products by way of example. When polymer-trypsin or other polymer alkaline protease products are employed, these are attached to a cationic polymer molecule to lower the effective and optimum pH activity range of the product. At any rate, at least a neutral protease is present and either an acid or alkaline protease or both may be present, covalently bound in one or more polymer-enzyme molecules. Even if an alkaline protease is present in an anionic polymer molecule, of if another enzyme is bound into a polymer which does not shift its pH activity or optimum activity into the relatively neutral pH range of the oral cavity, although not of maximum effectiveness, its presence is not deleterious to other enzymes in the same or different polymer molecules in the composition, since autogenous degradation does not occur due to the different environments in which the enzyme moieties are located. A neutral protease may be defined as a protease possessing maximum activity, or at least substantial activity, in the pH range of 6.0 to 8.0 and at the same time possessing the desired bond-splitting potentials that are associated with good oral hygiene performance.

The enzyme or enzymes incorporated into the polymer-enzyme product for use according to the present invention is preferably of microbiological origin. Thus, the objects of the invention can be accomplished without relying upon any relatively unavailable enzyme, and the invention can accordingly be practiced without fear of limitation due to unavailability of starting materials. This is indeed an important consideration from an economic standpoint.

Many such enzymes can conveniently be obtained from microorganisms which include bacteria, yeast, fungi and the like by using well-known fermentation methods such as those generally described in Kirk-Othmer, Encyclopedia of Chemical Technology 8, 173–204, and a great many microbially-produced enzymes are available commercially.

The exact activity of the enzyme or enzymes employed as starting material depends on the exact method of preparation and is not critical to the present invention providing only that the enzymatically active polymer-enzyme product produced therefrom has the desired enzymatic activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH; the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology 30, 291 (1947) and in Methods of Enzymology 2, 33 by Academic Press, New York (1955). Amylase activity is generally determined by the well-known dinitrosalicylic acid method of Bernfeld. Still other test procedures are known and well-documented in the art.

A particularly effective source of mixed enzymes which can be used as starting material in the present invention is a mutated Bacillus subtilis organism. The process for producing this organism and enzymes therefrom is described in U.S. Pat. 3,031,380. A culture of this Bacillus subtilis (strain AM) organism has been deposited with the United States Department of Agriculture, Agricultural Research Service, Northern Utilization Research and Development Division, 1815 N. University St., Peoria Ill. 61604, and has been assigned No. NRRL B–3411. The enzymatically active material produced by this organism has been found generally to consist of two protease, approximately 65–75% neutral protease (max. activity at a pH of 7.0–7.5) and about 25–35% alkaline protease (max. activity at a pH of 9 to 11). A significant amount of amylase is also present. There are generally about 700 thousand to about 1.2 million units of the valuable preponderant neutral protease activity per gram of isolated solids and about 250 thousand to about 400 thousand units of alkaline protease activity per gram as determined by Anson's Variation of the Kunitz "Casein" method. There are generally about 300 thousand to 350 thousand units of amylase activity per gram as determined by the Bernfeld method. As pointed out in the cited patent, the relative proportions of protease to amylase will vary depending on the exact conditions of growth of the microorganism, but we have found that the neutral and alkaline protease and the amylase will be produced, in at least some amounts, almost regardless of changes in the culture medium and other conditions of growth of the microorganism. The ratio of the activity of the alkaline protease to the activity of the neutral protease in the starting materials and in the polymer-enzyme product is preferably no greater than about 0.25–1.2 to one.

As used herein the term "unit" is taken to mean that quantity of enzyme which produces trichloroacetic acid-soluble fragments equal to 0.5 microgram of tyrosine from a 1 percent w./v. solution of casein at 37° C. in 10 minutes at a designated pH (in this instance a pH of 7).

Another source of mixed enzymes which can be used as starting material in accord with the present invention is B. subtilis strain NRRL 644, B. subtilis strain NRRL 941, and B subtilis strain IAM 1523 (Japanese Culture Collection). Still other B. subtilis microorganisms are available which produce protease, a mixture of protease, or protease and amylase, at least to a limited if not optimum extent. The so-called Streptomyces griseus neutral protease has a broad pH activity range and may constitute one starting enzyme for incorporation into the products of the invention. The predominately acid protease product from Aspergillus oryzae can also be used to advantage, especially when bound into an anionic polymer.

Representative enzymes suitable for incorporation into polymer-enzyme products for oral use in the compositions of the invention include:

*B. subtilis* neutral proteases, such as *B. subtilis* AM neutral protease (Monsanto)

*B. subtilis* var. amylosacchariticus neutral protease

Crystalline thermophilic bacterial neutral protease from *B. thermoproteolyticus* (thermolysin or crystalline thermoase-Daiwa Kasei)

Crude or diluted forms of such enzymes, such as *B. subtilis* AM enzyme mixture (Monsanto)

Bacterial Proteinase Novo.

Mixtures of any of the above types of enzymes with a carbohydrase or other proteases, such as *B. subtilis* alkaline proteases, such alkaline proteases being especially effective when attached to a cationic polymer.

Crude or purified forms of neutral protease obtained from *B. megaterium, B. cereus, B. polymyxa, B. amyloliquefaciens, Pseudomonas aeruginosa, Aeromonas proteolytica, A. oryzae, Streptomyces naraensis, Serratia marcescens,* and *Proteus vulgaris.*

*Aspergillus oryzae* neutral protease; e.g. from *A. oryzae* ATCC 14, 605:

*Streptomyces griseus* protease

Streptomyase (*Streptomyces rectus* protease)

Other proteases known by the trademarks Prolysin, Pronase, Morcin, Molsin, Prosin, or Rhozymes, e.g., A4, P11 (TM-Rohm & Haas)

Pepsin or Dextranase—especially when attached to an anionic polymer

Enzyme C from Myxobacter Al–1 protease, a bacteriolytic enzyme (R. L. Jackson and R. S. Wolfe, J. Biol. Chem. 243, 879 (1968); Lysozyme, or other lytic enzyme Any combination of the foregoing.

POLYMERIC MOIETY-CROSSLINKING-WATER-INSOLUBILITY/SOLUBILITY

In its broadest context, the polymer to which the enzyme or enzymes are attached contains carboxyl or anhydride linkages, especially where the enzymes contain an amino, hydroxyl, or sulfhydryl group not essential for their enzymatic activity. Where an enzyme contains a carboxyl group not essential for activity, the polymer can contain hydroxyl or amine groups for reaction herewith. The polymer may be EMA or an EMA-type polymer, or be any of those types previously disclosed for coupling or reaction with an enzyme, and in any event it is adapted to couple or react with the enzyme to effect covalent bonding and production of the desired polymer-enzyme product.

Since covalent-bonding is desired, it is understood that the carrier polymer is tailored to contain at least one reactive site for each polymer molecule with which the enzyme can react, either directly or indirectly, to produce a covalent bond. Accoding to the instant invention, this reactive site (or sites) is preferably a carboxyl or carboxylic anhydride group.

The polymeric reactant is preferably a polymer (a) comprising chains of carboxylic acid or carboxylic acid anhydride units, or (b) comprising units of carboxylic acid or carboxylic acid anhydride groups separated by carbon chains of at least one and not more than four carbon atoms, said carbon chains being part of a unit which contains a maximum of eighteen carbon atoms, said polymer chains being formed by polymerization of polymerizable acids or anhydrides or by copolymerizing a polymerizable acid or anhydride with another copolymerizable monomer, and preferably wherein the starting acid or anhydride and any additional copolymerizable monomer are unsaturated and such polymerization or copolymerization comprises addition type polymerization or copolymerization involving such unsaturation.

Among the polymers suitable for the practice of the instant invention, polymeric polyelectrolytes having units of the formula

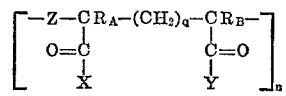

wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, lower alkoxyalkylene, and lower-aliphatic acyloxyalkylene) of 1 to 18 carbon atoms, inclusive, and preferably comprising a bivalent carbon chain having 1 to 4 carbon atoms, inclusive, said carbon chain being a part of a unit which contains 1 to 18 carbon atoms, inclusive, $q$ is zero or one, X and Y are selected from hydroxy, —O alkali metal, OR, —OH—$NH_3$, —OH—$R_3N$, —OH—$R_2NH$, —OH—$RNH_2$, —NRR', —(Q)$_p$—W—(NR'R')$_x$, and —(Q)$_p$—W—(OH)$_x$, wherein $x$ is 1 to 4 and $p$ is zero or 1, wherein R is selected from the group consisting of alkyl, phenylalkyl, or phenyl, in each case of 1 to 18 carbon atoms, wherein R' is H or R, wherein Q is oxygen or —NR'—, and wherein W is a bivalent radical preferably selected from lower-alkylene, phenyl phenylalkyl, phenylalkylphenyl, and alkylphenylalkyl having up to 20 carbon atoms, X and Y taken together can be an oxygen atom, and at least one of X and Y being hydroxyl or X and Y together constituting an oxygen atom, are preferred. Many of these polymers are commercially available and others are simple derivatives of commercially available products, which can be readily prepared either prior to or simultaneously with the enzyme attachment reaction, or produced as a minor modification of the basic polymer after attachment. Such polymers containing the above-described EMA-type units are hereinafter referred to as an "EMA-type polymer."

Since enzyme molecules have an extremely high molecular weight, even if the polymeric units exemplified as usable for attachment of the enzyme occurs only once in a polymer chain, for example, once in every several hundred units, reaction of the enzyme with this unit will result in a polymer-enzyme product having substantial enzymatic activity and one wherein the enzyme moiety constitutes a substantial portion of the molecular weight of the polymer-enzyme product. If more than one of the exemplified units is present, multiple attachments can be achieved with increased enzymatic activity of the product. As pointed out hereinafter, preferably the units of the formula given are recurring, $n$ being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are —NR or —N—W—(NR'R')$_x$ wherein R, W and R' have the values previously assigned.

A preferred type of polymeric material is the polymer of an olefinically unsaturated polycarboxylic acid or derivative with itself or in approximately equimolar proportions with at least one other monomer copolymerizable therewith. The polycarboxylic acid derivative can be of the non-vicinal type, including acrylic acid, acrylic anhydride, methacrylic acid, crotonic acid or their respective derivatives, including partial salts, amides and esters or of the vicinal type, including maleic, itaconic, citraconic, α,α-dimethyl maleic, α-butyl maleic, α-phenyl maleic, fumaric, aconitic, α-chloromaleic, α-bromomaleic, α-cyanomaleic acids including their partial salts, amides and esters. Anhydrides of any of the foregoing acids are advantageously employed.

Comonomers suitable for use with the above functional monomers include α-olefins such as ethylene, propylene, isobutylene, 1- or 2-butene, 1-hexene, 1-octene, 1-decene, 1-dodecene, 1-octadecene, and other vinyl monomers such as styrene, α-methyl styrene, vinyl toluene, vinyl acetate, vinyl amine, vinyl chloride, vinyl formate, vinyl propionate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of comonomers, in which case the total amount of the comonomers will preferably be about equimolar with respect to the polybasic acid derivatives. Although these copolymers can be prepared by direct polymerization of the various monomers, frequently they are more easily prepared by an after-reaction modification of an existing copolymer.

Copolymers of anhydrides and other monomer can be converted to carboxyl-containing copolymers by reaction with water, and to ammonium, alkali and alkaline earth metal and alkylamine salts thereof by reaction with alkali metal compounds, alkaline earth metal compounds, amines, or ammonia, either prior to, during, or subsequent to enzyme attachment. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxy amides and hydroxy esters, wherein the functional groups are separated by lower-alkylene, phenyl, phenylalkyl, phenylalkylphenyl, or alkylphenylalkyl, which are prepared in the same manner in each case with due consideration of preservation of enzyme attachment sites as previously stated. Other aryl groups may be present in place of phenyl groups. Particularly useful derivatives are those in which negatively-charged carboxyl groups are partially replaced with amine or amine salt groups. These are formed by reaction of said carboxyls with polyamines such as dimethylaminopropylamine or dialkylaminoalcohols such as dimethylaminoethanol, the former forming an amide linkage with the polymer and the latter an ester linkage. Suitable selection of the above derivatives permits control of several parameters of performance for the polymer-enzyme products used in the invention.

Representative dibasic acid or anhydride-olefin polymers, especially maleic acid or anhydride-olefin polymers, of the foregoing type (EMA-type) are known, for example, from U.S. Pats. 2,378,629; 2,396,785; 3,157,595 and 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, di-tertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 2,000, preferably about 8 to 1,000, and a molecular weight of about 1,000 to 200,000, preferably about 2,000 to 100,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. The product is obtained in solid form and is recovered by filtration, centrifugation or the like. Removal of any residual or adherent solvent can be effected by evaporation using moderate heating. Numerous of these polymers are those derived from ethylene and maleic anhydride in approximately equimolar proportions. The product is commercially available.

The maleic anhydride copolymers thus obtained have repeating anhydride linkages in the molecule, which are readily hydrolyzed by water to yield the acid form of the copolymer, rate of hydrolysis being proportional to temperature. In view of the fact that the attachment reactions are carried out in aqueous solutions or suspensions, or using water-solvent mixtures, the product of the covalent bonding of the enzyme to EMA has carboxyl or carboxylate groups attached to its chains adjacent the attached enzyme instead of anhydride groups, due to hydrolysis of anhydride groups which do not react with the enzyme during the reaction. The same is true of nonreacting anhydride groups present in other polymers, such as EMA-type polymers, which hydrolyze to carboxyl or carboxylate groups during the reaction.

The term "water-insoluble," as already stated, when applied means that the product concerned does not dissolve in water or aqueous solutions, even though it may have such characteristics as a high degree of swelling due to solvation by water, even to the extent of existence in a gel form. "Water-insoluble" products can be separated by methods including filtration, centrifugation, or sedimentation. Such characteristics are imparted by crosslinking. Additional insolubility can be effected by conversion of the polymer-enzyme product to an insoluble salt, e.g., the calcium salt, as by reaction of the polymer or polymer-enzyme product with lime water.

The term "water-soluble," when applied, means that the product concerned dissolves in water or aqueous solutions. As usual, however, this does not mean that the product dissolves completely at all concentrations or at all pH's. On the other hand, these water-soluble products are characterized by being soluble at a variety of concentrations and pH's, and they are generally soluble at pH's of 7 or greater.

In their soluble form, the polymer-enzyme products are characterized by the same general enzymatic activity as the parent native enzyme, but have all the advantages which are attendant upon applicability in solution or suspension form together with increased stability and prolonged actvity. In addition, because of their polymeric form, even though soluble, the polymer-enzyme products of the invention are separable from native enzyme or substrates, as well as impurities and coloring matter of an undesired nature, by normal separation procedures such as centrifugation, electrophoresis, or chromatography.

Thus, water-insoluble polymer-enzyme products, are produced by reacting the enzyme with a water-insoluble polymer or by causing the reaction product of the enzyme and polymer to become insoluble either by reaction with a polyfunctional crosslinking agent, such as a polyamine or polyol (including glycol), when this is necessary. The enzyme-polymer product is frequently at least in part insoluble per se because of interaction between the enzyme moiety and additional polymer chains. If the polymer is precrosslinked so as to have a three-dimensional structure or, in some cases, has a sufficiently long linear chain length, the starting polymer is already water-insoluble. Other methods of crosslinking exist and are well known in the art. Further detailed description follows.

Insolubilization via crosslinking can be introduced at any of three stages in the preparation of the polymer-enzyme products used in this invention:

(1) The carrier polymer may be crosslinked prior to attachment of the enzyme by any of several procedures well known in the art of polymer reactions (e.g., incorporation of multifunctional unsaturated monomers during preparation of the polymer or subsequent reaction of the polymer with a few mole percent of multifunctional amines, glycols, etc.).

(2) Multifunctional amines, glycols, etc., can be added concurrently with the enzyme in the enzyme-attachment or coupling step.

(3) A multifunctional crosslinking agent may be added to the product after the enzyme has been attached. Such crosslinking agents are added in controllable amounts sufficient to insolubilize the product.

In addition, the enzyme reactant to be attached or coupled to the polymer is commonly multifunctional in itself and thus contributes to the three-dimensional network character of the product. In fact, in many cases, the insolubilization effected in this manner alone is sufficient to impart insoluble characteristics to the product without use of additional crosslinking agents.

When markedly insoluble products are the objective, it is often advantageous to employ copolymers which already contain some crosslinking. Such crosslinked copolymers are known and are obtainable by conducting the polymerization, e.g., the copolymerization of maleic anhydride and hydrocarbon olefin, in the presence of a crosslinking agent, e.g., a compound containing two olefinic double bonds, such as divinylbenzene or vinylcrotonate, poly-1,2-butadiene or alpha, omega-diolefins. The quantity of crosslinking agent will vary with the degree of insolubility desired, but generally will be on the order of from 0.1% to 10% by weight of the total monomer mixture.

As one example of procedure for preparation of the three-dimension polymer network, where necessary or desirable, a di-functional compound can be used for crosslinking a preformed dibasic acid/$C_2$-$C_{18}$ monoolefin copolymer. This can be achieved by reaction between the copolymer and a polyamine, e.g., from 0.1 to 10 mole percent of ethylenediamine. Thus, the quantity of crosslinking of the overall polymer can be controlled. It is understood that ethylenediamine is a typical example of a crosslinking reagent, but many other compounds, such as the group of alkylene and other similar polyamines, can be used for this purpose. Soluble enzyme-polymer products, on the other hand, can advantageously be produced by somewhat different operating procedure.

General procedure for solubles preparation

In order to achieve high yields of water-soluble enzyme-polymer products, it is desirable to avoid crosslinking which results in insolubilization.

To prepare soluble enzyme-polymer derivatives, therefore, the reaction is preferably performed under substantially noncrosslinking conditions. The undesired crosslinking can be reduced by performing the attachment reaction in high dilution such that fewer reactions occur between several polymer molecules and a single enzyme molecule. Alternatively, high ratios of enzyme to polymer favor reaction of several enzyme molecules with a single polymer molecule. This, therefore, results in an agglomerated enzyme/polymer system which maintains the desired soluble properties of the individual enzyme molecules. An additional way in which solubles formation is favored is by conducting the reaction at high ionic strength to decrease aggregation of the native protein. While such procedures as described above are often desirable, it is not always necessary to use dilute solutions or high enzyme/polymer ratios to cause formation of soluble enzyme/polymer derivatives.

Preferred polymers are selected from the group consisting of:

(a) ethylene/maleic anhydride copolymer, vinyl methyl ether/maleic anhydride copolymer, vinylacetate/maleic anhydride copolymer, divinyl-ether/maleic anhydride cyclocopolymer, polymaleic anhydride and polyacrylic anhydride, and cationic derivatives thereof, and preferred enzymes include, in addition to neutral protease, at least one enzyme selected from the group consisting of (b) carbohydrase such as levanase, dextranase and the like, and bacteriolytic enzymes such as lysozyme, Myxobacter AL-1 protease, or the like, alkaline protease particularly when attached to a cationic or basic polyelectrolyte, all enzymes preferably being of microbiological origin, and combinations thereof. Such combinations of two or more enzyme-polymer products produce results superior to those obtained when only a single-enzyme-polymer product is employed and accordingly represents one preferred embodiment of the process. Use of combinations of a plurality of enzymes in the form of a single polymer-plural enzyme molecule is also contemplated by the present invention and represents another preferred embodiment thereof, inasmuch as a multiplicity of enzymatic activities can in this manner be imparted to the oral hygiene composition and the enzymatically-active ingredient thereof in the form of a stable product which is not subject to autolysis as are combinations or mere mixtures of enzymes. For example, a polymer-enzyme product containing a neutral protease and/or amylase and/or lipase and/or dextranase and/or a lytic enzyme such as lysozyme or Myxobacter AL-1 protease has been found especially suitable for use according to the invention and such represents an especially preferred embodiment of the invention. Enzymes other than those named in the foregoing may certainly be present in the molecule of the polymer-enzyme product employed, such as an alakline protease, for effective activity preferably attached to a cationic or basic polyelectrolyte polymer molecule, or any of the other enzymes previously mentioned, and each will perform its own special function.

DESCRIPTION OF THE PREFERRED EMBODIMENTS

The following preparations and examples are given by way of illustration only, and are not to be construed as limiting.

EXPERIMENTAL

The general procedure employed consisted of allowing cold solutions of enzymes in appropriate buffers to react overnight at 4° C. with cold, homogenized polymer, e.g., EMA, suspensions. EMA 21 was preferably employed, which had a molecular weight of ca. 20,000–30,000. Other molecular weight polymers may also be used. For example, EMA 11, having a molecular weight of about 2,000–3,000, is preferred for a soluble modified enzyme product, and EMA 31, having a molecular weight of about 60,000, may also be employed. Separation of soluble and insoluble adducts, after reaction, was achieved by centrifugation in the cold (Sorval SS-3 [TM] centrifuge, ca. 10,000 r.p.m. and 10 min. centrifugation time). The soluble adducts were exhaustively dialyzed against water in the cold and then lyophilized. Insoluble adducts were washed (and centrifuged), usually ten times with cold buffer and five times with cold distilled water and then lyophilized.

Preparations 1–11—EMA-Neutral protease, alkaline protease and amylase polymeric products The reactants utilized in the production of the *Bacillus subtilis* enzyme mixture/EMA–21 adduct were prepared to the following requirements:

(1) Anhydrous EMA-21 was prepared from HEMA-21 (hydrolyzed EMA) by heating in vacuum at a temperature of 105° C. overnight. The molecular weight of EMA-21 is approximately 20–30,000. In order to insure a maximized anhydride content a freshly prepared anhydride polymer is utilized or the water of hydrolysis is separated therefrom in a boiling xylene suspension of the polymer.

(2) The veronal buffer utilized was 0.05 M with a pH of 7.8.

(3) The calcium acetate solution employed was 1 M. This was added in twice the volume in order to bring the enzyme solution to the required calcium ion concentration. Alternatively, a 2M concentration solution was employed. Different samples of *Bacillus subtilis* AM enzyme mixture, each containing neutral protease, alkaline protease, and amylase, were employed. The material was of three types as follows:

(1) *B. subtilis* strain AM enzyme mixture with an activity of $1.9 \times 10^6$ protease units/g. (pH 7) and partly insoluble.

(2) *B. subtilis* strain AM enzyme mixture with an activity of $1.0 \times 10^6$ protease units/g. (pH 7) and partly inslouble.

(3) *B. subtilis* strain AM enzyme mixture with an activity of $1.43 \times 10^6$ protease units/g. (pH 7) and completely soluble.

A solvent procedure may also be employed instead of that shown above, but such procedure is generally not preferred.

(A) Attachment

The general procedure is illustrated as follows:

The crude *B. subtilis* enzyme mixture is suspended in cold distilled water and stirred magnetically for one hour at 4° C. The resulting mixture is then centrifuged at 8,000 r.p.m. for ten minutes to remove suspended and inactive solids. (This step is omitted for the completely soluble enzyme system, No. SG-2144.) The supernatant is separated and made 0.065 M in calcium ion by the addition of 1 M Ca(OAc)$_2$ and the solution is then stirred for thirty minutes in the cold (4° C.). The mixture is then centrifuged at 8,000 r.p.m. for ten minutes to remove precipitated and inactive solids. To the clarified supernatant there is added, with stirring, cold 0.05 M veronal buffer, pH 7.8. While the above solutions are being prepared an appropriate quantity of EMA (*B. subtilis* enzymes: EMA 21, 8:1 w./w.) is dissolved in dimethylsulfoxide. This solution is added dropwise to the stirred, cold enzyme solution (vide supra) and the mixture is then stirred overnight at 4° C. The mixture is then centrifuged at 8,000 r.p.m. for ten minutes and the solid product is collected. The solid adduct is washed using twice its volume of cold, distilled water, with stirring and centrifugation. The adducts are washed in this manner fifteen times and the product was then isolated by lyophilization. Yields and enzymatic activities of the adduct preparations are recorded in Table I.

The yield of insoluble products is advantageously achieved, when desired, by performing the reaction in the presence of a crosslinking agent such as hexamethylenediamine, e.g., at a 1 to 2% concentration relative to the amount of polymer employed.

TABLE I

| Prep. No. | B. subtilis enzyme mixture No. | Original protease activity (units/g.) $10^{-6}$ | Amount of B. subtilis enzyme mixture (g.) | B. subtilis enzyme mixture/EMA ratio | Recovered protease activity (units/g.) | Recovered adduct (g.) | Percent Activity retained | Percent Weight recovered |
|---|---|---|---|---|---|---|---|---|
| 1 | R.G.A. | 6.0 | 3 | 8:1 | 3,045,000 | 0.780 | 50.7 | 26.0 |
| 2 | SG-2046 | 1.9 | 20 | 8:1 | 1,400,000 | 5.493 | 73.7 | 27.5 |
| 3 | SG-2046 | 1.9 | 20 | 8:1 | 1,050,000 | 5.260 | 55.2 | 26.3 |
| 4 | SG-2046 | 1.9 | 20 | 8:1 | 1,515,000 | 4.962 | 79.7 | 24.8 |
| 5 | SG-2046 | 1.9 | 150 | 8:1 | 1,400,000 | 52.70 | 73.7 | 35.1 |
| 6 | SG-2046 | 1.9 | 55 | 8:1 | 670,000 | 11.10 | 35.2 | 20.0 |
| 7 | SG-2046 | 1.9 | 55 | 8:1 | 288,000 | 12.90 | 43.0 | 23.4 |
| 8 | SG-2046 | 1.9 | ¹750 | 8:1 | 1,312,500 | 0.163 | 68.9 | 21.7 |
| 9 | SG-2089 | 1.0 | 55 | 8:1 | 375,000 | 119.2 | 37.5 | 30.9 |
| 10 | SG-2144 | 1.4 | ²4×55 | 8:1 | 1,250,000 | 70.0 | 87.3 | 31.8 |
| 11 | SG-2144 | 1.4 | ³9×55 | 8:1 | 650,000 | 400 | 45.4 | 46.0 |

¹ Mg.
² Combining of four 55 gram runs.
³ Combining of nine 55 gram runs.

Assays

Amylase assays were performed, using the established Bernfeld procedure, with a 5-minute heating for color development.

Protease assays at pH 7 were performed by the established Anson procedure; assays at pH 10 differed only in that the solution of casein was neutralized to pH 10 with dilute phosphoric acid.

Stability studies

Stability studies on the components of the *B. subtilis* AM enzyme mixture (amylase, protease assayed at pH 7.0 and pH 10.0) and on insoluble EMA derivative thereof were carried out at 25°, 37° and 50° C. over periods up to 22 days. The effect of added calcium was more noticeable on the stability of the EMA-enzyme derivative, possibly due to removal of endogenous calcium during the preparation. The amylase activity was fairly stable and was increased at pH 8–10 in the EMA-enzyme derivative. A similar effect was observed with the total protease activity (assayed at pH 7.0) and alkaline protease (assayed at pH 10.0) in the long term studies at pH 7–10 at 25° and 37°. In the higher temperature stability study (up to 80°) with only 30 minute heating, the increased stability of the EMA-enzyme derivative amylase activity at higher pHs was well demonstrated. The protease does not show a corresponding termendously-increased thermal stability, although the stability of the neutral protease in the EMA adduct was itself about twice that of the native enzyme and stability of the alkaline protease in the EMA adduct form was about four times that of the native enzyme after 30 minutes at 80° C.

Properties and characterization

Positive proof that all three types of enzymes are present in the polymeric molecule is provided by the following:

(1) The EMA-plural enzyme product has amylase activity with a specific activity almost as high as the two unattached enzyme mixtures used as controls, as shown in Table II.

(2) The EMA-plural enzyme product has protease activity at pH 7 and pH 10 in approximately the same ratio as exists between the unattached enzyme mixtures used as control. The specific activity of the EMA-plural enzyme product at the two pHs at which tested is, moreover, almost identical to values found for the two control enzymes mixtures, also as shown in Table II.

TABLE II

| | Amylase units/g. | Protease (neutral) pH 7.0, unit/g. | Protease (alkaline) pH 10.0, unit/g. |
|---|---|---|---|
| Insoluble EMA-plural enzyme product | 405,000 | 1,090,000 | 680,000 |
| Enzyme A | 666,000 | 1,720,000 | 990,000 |
| Enzyme B | 340,000 | 960,000 | 550,000 |

Stability studies showed an unpredictably high stability for the polymer-enzyme products, as shown in Tables III–VIII.

TABLE III.—THE EFFECT OF ATTACHMENT TO EMA ON B. SUBTILIS AMYLASE STABILITY

[Period of heating 30 minutes, pH 10.0]

| Temperature (° C.) | 25 | 50 | 60 | 70 | 80 |
|---|---|---|---|---|---|
| Insoluble EMA-plural enzyme product | (100) | 104 | 100 | 70 | 16 |
| Control Enzyme | (100) | 99 | 85 | 43 | 2 |

TABLE IV.—THE EFFECT OF ATTACHMENT TO EMA ON B. SUBTILIS NEUTRAL PROTEASE STABILITY

[Period of heating 30 minutes, pH 8.0; protease assay at pH 10.0]

| Temperature (° C.) | 25 | 50 | 60 | 70 | 80 |
|---|---|---|---|---|---|
| Insoluble EMA-plural enzyme product | (100) | 92 | 63 | 19 | 11 |
| Control enzyme | (100) | 79 | 54 | 12 | 6 |

TABLE V.—THE STABILITY OF ALKALINE PROTEASE AND ITS EMA DERIVATIVE AT pH 10.0

[Period of heating 30 minutes; assay at pH 10.0]

| Temperature (° C.) | 25 | 50 | 60 | 70 | 80 |
|---|---|---|---|---|---|
| Insoluble EMA-plural enzyme product | (100) | 70 | 52 | 35 | 13 |
| Control enzyme | (100) | 68 | 49 | 8 | 3 |

TABLE VI.—THE EFFECT OF EMA ATTACHMENT ON STABILITY OF B. SUBTILIS NEUTRAL PROTEASE

[Temp., 25° C.; pH 9.0; assay at pH 7.0 in 0.1% CaAc$_2$]

| Time (hours) | 0 | 22 | 46 | 70 | 166 | 238 |
|---|---|---|---|---|---|---|
| Insoluble EMA-plural enzyme product | (100) | 67 | 28 | 28 | 27 | 23 |
| Control enzyme | (100) | 28 | 15 | 20 | 14 | 2 |

TABLE VII.—THE EFFECT OF ATTACHMENT TO EMA ON STABILITY OF B. SUBTILIS ALKALINE PROTEASE

[Temp., 25° C.; pH 7.0 in 0.1% CaAc$_2$; assay at pH 10.0]

| Time (hours) | 0 | 22 | 46 | 94 | 166 |
|---|---|---|---|---|---|
| Insoluble EMA-plural enzyme product | (100) | 90 | 100 | 90 | 92 |
| Control enzyme | (100) | 83 | 71 | 17 | 4 |

TABLE VIII.—THE EFFECT OF ATTACHMENT TO EMA ON STABILITY OF B. SUBTILIS ALKALINE PROTEASE

[Temp., 50° C.; pH 10.0 in 0.1% CaAc$_2$; assay at pH 10.0]

| Time (hours) | 0 | 22 | 46 | 94 | 166 | 190 | 214 |
|---|---|---|---|---|---|---|---|
| Insoluble EMA-plural enzyme product | (100) | 62 | 27 | 23 | 19 | 12 | 12 |
| Control enzyme | (100) | 22 | 9 | 3 | 2 | 6 | 1 |

Preparation 12—*Bacillus subtilis* neutral protease and dextranase-EMA soluble and insoluble products

*B. subtilis* neutral protease (100 mg.) and dextranase (100 mg) are dissolved in 75 ml. cold 0.1 M phosphate buffer, pH 7.5, which is also 0.01 M in calcium acetate. To this solution is added a homogenized mixture of EMA (250 mg.) in 100 ml. cold 0.1 M phosphate buffer, pH 7.5. The combined mixture is stirred overnight in the cold (4° C.) and the solid is separated from the supernatant solution by centrifugation. After dialysis and lyophilization, the insoluble *B. subtilis* neutral protease and dextranase-EMA product possesses 43% of the original protease activity and 27% of the original dextranase activity.

The supernatant solution is dialyzed and lyophilized to yield a soluble solid *B. subtilis* neutral protease and dextranase-EMA product which possesses 64% of the original protease activity and 62% of the original dextranase activity.

Employment of 1% hexamethylenediamine increases the amount of insoluble crosslinked product.

Preparation 13—Dextranase-EMA soluble and insoluble products

Dextranase was obtained as a solid precipitated by organic solvent addition to a fermentation beer of *Penicillium funiculosum* (strain NRRL 1132).

Dextranase (100 mg.) is dissolved in 50 ml. cold 0.1 M phosphate buffer, pH 7.5, which is 0.01 M in calcium acetate. To this solution is added a homogenized mixture of EMA (100 mg.) in 50 ml. cold 0.1 M phosphate buffer. The combined mixture is stirred overnight in the cold (4° C.) and the solid is separated from the supernatant solution by centrifugation. After dialysis and lyophilization the insoluble dextranase-EMA product possesses 35% of the original dextranase activity.

The supernatant solution is dialyzed and lyophilized to yield a soluble solid dextranase-EMA product which possesses 68% of the original dextranase activity.

Preparation 14–39—Other polymer-enzyme products

The following additional polymer-enzyme products are prepared in accord with the procedure of Preparation 1. The percentages when given are the percentages of the enzymatic activity present in the polymer-enzyme product compared with the activity of the starting native enzyme.

14 Neutral protease/alkaline protease - vinyl methyl ether/maleic anhydride copolymer
    Insoluble: ca. 50% each
15 Neutral protease/alkaline protease/amylase-vinyl acetate/maleic anhydride copolymer
    Insoluble: ca. 60% each
16 Neutral protease-divinyl ether/maleic anhydride cyclocopolymer
    Insoluble: ca. 50% each
17 Neutral protease/alkaline protease-polymaleic anhydride polymer
    Insoluble: ca. 70% each
18 Neutral protease/alkaline protease - polyacrylic anhydride polymer
    Insoluble: ca. 50% each
19 *B. subtilis* neutral and alkaline proteases and amylase-EMA
    Soluble: 42%, 57%, 69%
    Insoluble: 32%, 48%, 62%
20 Neutral protease/dextranase-polyacrylic anhydride
    Soluble: 62%, 52%
    Insoluble: 40%, 28%
21 *B. subtilis* neutral and alkaline protease-EMA
    Soluble: 47%, 59%
    Insoluble: 38%, 52%
22 *B. subtilis* neutral and alkaline protease-EMA
    Soluble: 43%, 56%
    Insoluble: 35%, 47%
23 Lysozyme-EMA
24 *B. subtilis* neutral and alkaline protease dextranase-EMA
25 *B. subtilis* neutral and alkaline protease/amylase and dextranase-EMA
26 Neutral protease (*B. subtilis* var. amylosacchariticus-EMA
27 Neutral protease/amylase-vinyl methyl ether/maleic anhydride copolymer
28 Dextranase/neutral protease-divinyl ether/maleic anhydride cyclocopolymer
29 Alkaline and neutral protease-polymaleic anhydride polymer
30 Acid protease (*A. oryzae*)-polyacrylic anhydride polymer
31 Acid protease (*A. oryzae*)-EMA
32 Myxobacter AL-1 protease-EMA
33 Alkaline protease - dimethylaminopropyl amide of EMA
34 *B. subtilis* neutral and alkaline protease/amylase-dimethylaminoethyl imide of EMA
35 Alkaline protease - dimethylaminopropanol ester of EMA
36 *B. subtilis* neutral and alkaline protease/amylase and Myxobacter AL-1 protease-EMA 37 B. *subtilis* AM neutral protease-EMA
38 B. *subtilis* AM neutral protease/dextranase-EMA
39 Lysozyme/neutral protease/alkaline protease-diethylaminopropylimide of EMA

EXAMPLE 1

Mouthwash compositions containing polymer-enzyme products

Typical mouthwash compositions are prepared according to the following general specifications:

| | Weight percent |
|---|---|
| Water | 30–99 |
| Alcohol | 0–70 |
| Glycerol | 0–25 |
| Surfactant | 0.1 |
| Antimicrobial agent, e.g., cetylpyridinium chloride | 0.01–0.1 |
| Flavoring | 0.1–0.2 |
| Coloring | 0–0.2 |
| Polymer-enzyme product | 0.1–2 |

When one or more, preferably a plurality of the polymer-enzyme products of Preparations 1–39 are used as enzymatically-active ingredients in the foregoing formulation, the compositions are stable even after long periods of storage, long-acting in use by virtue of their stability and substantivity, and extremely effective in removing stains from teeth as well as retarding soft accretions and calculus if used over an extended period. The compositions are most acceptable in appearance and also most effective when they embody water-soluble polymer-enzyme products but longer-acting when they embody the insoluble products.

Particularly effective compositions are those which embody the soluble and/or insoluble polymer-enzyme products of the foregoing preparations, reference being to the preparation number:

| (A) | 1 | (E) | 1+13+23 | (I) | 36 | (M) | 3+30+13 |
|---|---|---|---|---|---|---|---|
| (B) | 1+13 | (F) | 24 | (J) | 38 | (N) | 20 |
| (C) | 12 | (G) | 25 | (K) | 34 | (O) | 4+23 |
| (D) | 19 | (H) | 32 | (L) | 3+30 | (P) | 28 |

The polymer-plural enzyme products appear to be most effective, as are those embodying a polymer-neutral protease or a polymer neutral protease plus a polymer-dextranase, and especially a polymer-neutral protease/dextranase product. The polymer-Myxobacter AL-1 protease containing compositions are also especially effective.

EXAMPLE 2

Typical toothpaste compositions containing polymer-enzyme product

| | Weight percent |
|---|---|
| (1) Polishing or abrasive agent | 40–60 |
| (2) Excipient | 20–30 |
| (3) Modifier (thickening agent) | 0.5–3.0 |
| (4) Detergent | 0.5–5.0 |
| (5) Water | 10–20 |
| (6) Polymer-enzyme product | 0.4–4.0 |
| (7) Flavor or sweetening agent. | |

KEY: (1) $CaCO_3$, CDP (Dicalcium Phosphate), CaP, $CaSO_4$, are representative. (2) Glycerine, propylene glycol, sorbitol are representative. (3) Tragacanth, Karaya, carrageen, guar, carboxymethylcellulose, carbopol are representative. (4) Alkaline earth or alkali metal fatty acid salts, or fatty acid mono or diglycerides, or synthetic detergents are representative.

When one or more of the polymer-enzyme products of Preparations 1–39 are used as enzymatically-active ingredients in the foregoing formulation, the compositions are stable even after long periods of storage, long-acting in use by virtue of their stability and substantivity, and extremely effective in removing stains from teeth as well as retarding soft accretions and calculus if used over an extended period. The compositions are most effective when they embody water-soluble polymer-enzyme products but longer acting when they embody the insoluble products.

Particularly effective compositions are those which embody the soluble and/or insoluble polymer-enzyme products of the foregoing preparations, reference being to the preparation number:

| (A) | 1 | (E) | 1+13+23 | (I) | 36 | (M) | 3+30+13 |
|---|---|---|---|---|---|---|---|
| (B) | 1+13 | (F) | 24 | (J) | 38 | (N) | 20 |
| (C) | 12 | (G) | 25 | (K) | 34 | (O) | 23 |
| (D) | 19 | (H) | 32 | (L) | 3+30 | (P) | 28 |

The polymer-plural enzyme products again appear to be most effective, as are those embodying a polymer-neutral protease or a polymer-neutral protease plus a polymer-dextranase, and especially a polymer-neutral protease/dextranase product. The polymer-Myxobacter AL-1 protease containing compositions are also especially effective.

EXAMPLE 3

Chewing gum compositions containing polymer-enzyme product

Typical chewing gum compositions are prepared according to the following general specifications:

| | Weight percent |
|---|---|
| Gum base (natural and synthetic elastomers and fillers) | 20–35 |
| Glucose | 10–20 |
| Sucrose | 50–70 |
| Polymer-enzyme product | 0.4–2 |
| Flavor. | |

When one or more of the polymer-enzyme products of Preparations 1–39 are used as enzymatically-active ingredients in the foregoing formulation, the compositions are stable even after long periods of storage is packaged form, long-acting in use by virtue of their stability and substantivity, and extremely effective in removing stains from teeth as well as retarding soft accretions and calculus if used over an extended period. The compositions are most effective when they embody water-soluble polymer-enzyme products but longer acting when they embody the insoluble products.

Particularly effective compositions are those which embody the soluble and-or insoluble polymer-enzyme products of the foregoing preparations, reference being to the preparation number:

| (A) | 1 | (E) | 1+13+23 | (I) | 36 | (M) | 3+30+13 |
|---|---|---|---|---|---|---|---|
| (B) | 1+13 | (F) | 24 | (J) | 38 | (N) | 20 |
| (C) | 12 | (G) | 25 | (K) | 34 | (O) | 23 |
| (D) | 19 | (H) | 32 | (L) | 3+30 | (P) | 28 |

The polymer-plural enzyme products once more appear to be most effective, as are those embodying a polymer-neutral protease or a polymer-neutral protease plus a polymer-dextranase, and especially a polymer-neutral protease/dextranase product. The polymer Myxobacter AL-1 protease containing compositions are also especially effective.

EXAMPLE 4

Further polymer-enzyme containing toothpaste compositions

Additional polymer-enzyme containing toothpaste compositions are prepared according to the following specifications:

| | Parts by weight |
|---|---|
| CDP (calcium diphosphate) | 50 |
| Bentonite | 5 |
| Tragacanth | 0.5 |
| Water | 25 |
| Gycerine | 25 |
| Oil of peppermint | 0.5 |
| Menthol | 0.02 |
| Saccaharin Na | 0.05 |
| Methyl paraben (preservative) | 0.05 |
| Polymer-enzyme product | 0.11 |
| Detergent | 1.00 |

When one or more of the polymer-enzyme products of Preparations 1–39 are used as enzymatically-active ingredients in the foregoing formulation, the compositions are stable even after long periods of storage, long-acting in use by virtue of their stability and substantivity, and extremely effective in removing stain from teeth as well as retarding soft accretions and calculus if used over an extended period. The compositions are most effective when they embody water-soluble polymer-enzyme products but longer-acting when they embody the insoluble products.

Particularly effective compositions are those which embody the soluble and/or insoluble polymer-enzyme products of the foregoing preparations, reference being to the preparation number:

| | | | | | | | |
|---|---|---|---|---|---|---|---|
| (A) | 1 | (E) | 1+13+23 | (I) | 36 | (M) | 3+30+13 |
| (B) | 1+13 | (F) | 24 | (J) | 38 | (N) | 20 |
| (C) | 12 | (G) | 25 | (K) | 34 | (O) | 23 |
| (D) | 19 | (H) | 32 | (L) | 3+30 | (P) | 28 |

The polymer-plural enzyme products again appear to be most effective, as are those embodying a polymer-neutral protease or a polymer-neutral protease plus a polymer-dextranase, and especially a polymer-neutral protease/dextranase product. The polymer Myxobacter AL–1 protease containing compositions are also especially effective.

EXAMPLE 5

Further polymer-enzyme containing chewing gum compositions

Additional polymer-enzyme containing chewing gum compositions are prepared according to the following specifications:

| | Percent by weight |
|---|---|
| Gum base | 28.3 |
| Sucrose | 56.2 |
| Glucose | 14.0 |
| Flavoring | .7 |
| Polymer-enzyme product | .8 |

When one or more of the polymer enzyme products of Preparations 1–39 are used as enzymatically-active ingredients in the foregoing formulations, the compositions are stable even after long periods of storage, long-acting in use by virtue of their stability and substantivity, and extremely effective in removing stains from teeth as well as retarding soft accretions and calculus if used over an extended period. The compositions are most effective when they embody water-soluble polymer-enzyme products, but longer acting when they embody the insoluble products.

Particularly effective compositions are those which embody the soluble and/or insoluble polymer-enzyme products of the foregoing preparations, reference being to the preparation number:

| | | | | | | | |
|---|---|---|---|---|---|---|---|
| (A) | 1 | (E) | 1+13+23 | (I) | 36 | (M) | 3+30+13 |
| (B) | 1+13 | (F) | 24 | (J) | 38 | (N) | 20 |
| (C) | 12 | (G) | 25 | (K) | 34 | (O) | 23 |
| (D) | 19 | (H) | 32 | (L) | 3+30 | (P) | 28 |

The polymer-plural enzyme products once more appear to be most effective, as are those embodying a polymer-neutral protease or a polymer-neutral protase plus a polymer-dextranase, and especially a polymer-neutral protease/dextranase product. The polymer Myxobacter AL–1 protease containing compositions are also especially effective.

Although, in the foregoing examples, oral hygiene compositions have been shown in aqueous form, that is, containing some water, such compositions can also be prepared which are non-aqueous and which rely for their fluid component upon a pharmocologically acceptable fluid such as glycerin, ethylene glycol, ethyl Cellosolve, Carbitols (TM) such as diethylene glycol monoethyl ether, or esters thereof, e.g., the acetate, or a Carbowax (TM) such as the lower molecular weight polyethylene glycols, or similar materials. Of course, any material employed must be sufficiently nontoxic to be pharmacologically acceptable to the oral cavity.

Such compositions, then, will comprise the enzymatically-active polymer-enzyme product together with a carrier which is either solid, semisolid, or elastomeric (natural or synthetic), or which is a fluid. This fluid may, as already indicated, include or be water, or it may be a nonaqueous fluid. Nonaqueous compositions are frequently employed for mouthwash or gargle compositions, or the like, which are to be diluted with water immediately prior to use. The compositions may therefore be either aqueous or nonaqueous in nature. If the carrier employed is a fluid carrier, rather than a solid, semisolid or elastomeric carrier, the composition for oral hygiene use will also employ either an antimicrobial agent, either bactericidal or bacteriostatic in effect, to prevent further basteriological deterioration of the oral cavity subsequent to treatment with the polymer-enzyme product of the invention or compositions containing the same, or a suspending agent, e.g., an emulsifying or a dispersing agent, especially when the polymer-enzyme product employed is insoluble by its nature, although a dispersing, emulsifying, or other suspending agent will ordinarily also be advantageously employed when the carrier is a fluid even when the polymer-enzyme product is soluble in nature. Antimicrobial agents employed may be of any conventional type. In fact, a considerable concentration of alcohol in the composition will serve as an effective antimicrobial agent if it is desired to eliminate more conventional types of antimicrobial agent from the composition. Antimicrobial agents and emulsifying, dispersing, or other suspending agents may of course also be incorporated in nonfluid forms of the composition, involving nonfluid carriers, but incorporation of suspending, e.g., dispersing or emulsifying agents in solid, semisolid or elastomeric forms of the composition is not usually essential, due to the presence of other components of these types of composition, as it is with a fluid composition, especially an aqueous composition, and the employment of fluid carriers without simultaneous employment of an antimicrobial agent and/or a suspending agent, including emulsifying or dispersing agents, would leave much to be desired from the standpoint of overall effectiveness of the fluid compositions, to say nothing of appearance.

The same effects and/or substantially similar results are produced by embodying other or additional polymer-enzyme products in the oral hygiene compositions of the invention. Moreover, the compositions may take the form of mouthwashes or gargles, preferably concentrated for considerable dilution before use, candies, especially masticable candies, lozenges, tablets, toothpowders, sprays of squeeze-bottle or aerosol type, denture cements or aids, if desired in combination with a local anesthetic, or other similar oral hygiene compositions.

The oral hygiene compositions of the invention may, for example, take the form of heavily impregnated or coated dental floss, wherein the impregnation or coating comprises a polymer-enzyme product, either soluble or insoluble; gauze impregnated or coated with the polymer-enzyme product; tissues coated or impregnated with the polymer-enzyme product; swabs impregnated or coated with the polymer-enzyme product; toothpicks or sticks of wood, plastic, or metal coated or impregnated with a polymer-enzyme product either alone or in combination with a binder; toothbrushes having bristles coated or impregnated with a polymer-enzyme product; oral bandages capable of adhering to the interior of the oral cavity, for example, to the gum or the roof or wall of the mouth, or to a tooth, impregnated, coated, or otherwise containing a soluble or insoluble polymer-enzyme product; tongue depressors or similar items impregnated or coated with a soluble or insoluble form of the polymer-enzyme product, alone or in composition form; cotton impregnated or coated with polymer-enzyme product; usual creams, salves or ointments containing either a soluble or insoluble form of a polymer-enzyme product; and other forms for use in treatment of the oral cavity which will be readily apparent and which are too numerous to mention, in all of which the polymer-enzyme product is embodied in either soluble or insoluble form, alone or in combination with a suitable binder, carrier, or like material or composition.

When the oral hygiene composition is in the form of a chewing gum or the like, selection of the particular water-soluble or insoluble form is again a matter of choice. For maximum abrasiveness and bulking effect, insoluble forms are preferred, whereas for characteristics more normally indigenous to chewing gum, and for maximum contact of the enzymatically-active component with the substrate, water-soluble forms are preferred. In their insoluble form, the polymer-enzyme products and gum containing the same have a longer period of enzymatic activity, even after the period of actual chewing, possibly due to a greater affinity of the insoluble polymer-enzyme product for the tooth surface, or due to some type of coating formed thereby on the surface of the tooth. The same is true of lozenges, tablets, dragees, candies or like forms in which the oral compositions of the invention may be presented.

The field of application of the composition and the enzymatically-active ingredient of the invention is not limited to humans, since the problem of oral hygiene exists also in animals, especially household pets such as dogs and cats, zoo animals, and the like. For application in this area, the enzymatically-active polymer-enzyme products employed according to the invention are usually incorporated with a suitable carrier, which is preferably masticable, and which may take the same form as a composition for human use but which may also take other forms which are more adapted for animal acceptance. For example, biscuits, chow, meal and other forms of food, in various shapes and designs and with flavors adapted to induce animal acceptance and attraction, may be utilized. Although the compositions are as usual preferably prepared and/or marketed as dry compositions, such compositions may also take the form of canned or packaged foods, again preferably but not necessarily of a masticable nature, having various degrees of vapor or water content, although long-standing under conditions such as elevated temperature which favor enzymatic activity may impair stability in such cases so that cold storage is recommended. As a further embodiment, the compositions may take the form of capsules, pellets, microcapsules, coascervates with lipids, colloids, or the like, either for distribution in or predistributed in foods of various types. When in such forms, the compositions of the invention can obviously be packaged independently of the food with which ultimately to be combined, and distributed either separately or in combination with the food in which to be dispersed or dissolved, with obvious stability advantages from such packaging procedure. To the extent applicable from the standpoint of human acceptance, the same compositions and modes of administration as are adaptable for animal use or treatment are, of course, utilizable in the human oral hygiene area as well.

Since the polymer-enzyme products generally possess less than 100% of the activity of the native enzyme, it is frequently advantageous to employ somewhat greater amounts of the polymer-enzyme product than would be employed if the native enzyme was used, but as will be apparent the lack of deterioration or degradation during production, storage and use increases substantially the effective enzymatic-activity available in the composition at the time of use when polymer-enzyme components are employed, so that about equivalent amounts can be safely used. The polymer-enzyme products should generally be employed at a level of about 0.01 to 4%, usually about 0.05 to 2% by weight in dentifrices and similar products, especially when the polymer-enzyme products has a protease activity (casein digestion assay at pH 7.0) of at least about 20,000 units/gram, and preferably at least about 50,000 units per gram or thereabout. In mouthwashes and similar food compositions, they should ordinarily be employed in corresponding amounts on a weight basis, to permit a daily oral exposure of "dosage" of about 2,000–20,000 units, and at least about 650 units per usage. Other operative ranges will be apparent to one skilled in the art. When employed in fluid dosage forms or compositions, the polymer-enzyme product is preferably in water-soluble form to facilitate maximum contact with substrate whereas, in solid or paste forms or the like, the determination of whether the polymer-enzyme product is in water-insoluble or water-soluble form is a matter of choice, depending upon whether maximum abrasive or bulking properties are considered more desirable than maximum contact of enzymatically-active component with substrate, taking into consideration the somewhat longer ezymatic action of the insoluble form of the polymer-enzyme product.

In a typical tooth paste or tooth powder composition, the enzyme activity is at least about 200 units per gram of composition. In a typical mouthwash composition the enzyme activity is at least about 30 units per milliter of composition in concentrated form and at least about 4 units per milliliter of composition in dilute form.

Application or use of the compositions of the invention is, of course, in conventional manner, by bringing an effective amount of the polymer-enzyme product into contact with the oral cavity or the particular portion thereof of interest for a particular application, the novel aspects of the use or application being that the enzymatically-active polymer-enzyme product which is enzymatically-active at the relatively neutral pH range of the oral cavity is employed in the particular application or use involved, whether it be brushing of teeth, gargling, mouthwashing, or the like. Obviously, such compositions, for whatever the intended oral hygiene used, can contain the enzymatically-active water-soluble or water-insoluble polymer enzyme product as the sole active ingredient, alone or together with a binder or suitable orally physiologically acceptable carrier, or as one component of a composition which includes other chemically or physically active or inactive ingredients for the intended oral hygiene purpose, such as the already-mentioned surfactant, germicide, abrasive, or the like.

Whatever the exact form employed, it has surprisingly been found that the polymer-enzyme products, constituting the enzymatically active ingredient of the compositions of the invention, have a relatively strong attraction or affinity for tooth surfaces, especially when a neutral protease is covalently bound therein, so that regardless of the exact type of composition or form or mode of administration employed, a substantial portion of the enzymatically-active polymer-enzyme product situates itself upon the tooth surface where its highly desirable enzymatic action can effectively take place over an extended period. This is especially true when the insoluble form of the polymer-enzyme is employed. In either case, the enzymatic action of the compositions of the invention continues even after cessation of the individual treatment or use period, an important aspect since gargling, mouthwashing, or brushing after every meal is not possible. In fact, even after a test period of treatment is ended, the enzymatic activity with its advantageous effects of soft accretion, calculus and stain removal and prevention continues uninterruptedly over a further substantial period.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

What is claimed is:

1. An oral hygiene composition comprising an enzymatically effective amount of a polymer-enzyme product having protease activity within the relatively neutral pH range of the oral cavity and in which composition neutral protease and dextranase are covalently bonded to a polymer (a) comprising chains of carboxylic acid or carboxylic acid anhydride units, or (b) comprising units of carboxylic acid or carboxylic acid anhydride groups separated by carbon chains of at least one and not more than four carbon atoms, said carbon chains being part of a unit which contains a maximum of 18 carbon atoms, wherein the polymer is selected from the group consisting of ethylene/maleic anhydride copolymer, polyacrylic acid anhydride, and divinyl ether/maleic anhydride copolymer, and a carrier which is pharmacologically acceptable to the oral cavity, said enzymatically effective amount being sufficient to digest a substrate present in the oral cavity.

2. Composition of claim 1, in the form of a dentifrice.

3. Composition of claim 1, in the form of a mouthwash.

4. Composition of claim 1, wherein the polymer-enzyme product is in water-soluble form.

5. Composition of claim 1, wherein the polymer-enzyme product is in water-insoluble form.

6. Composition of claim 1, comprising both a polymer-enzyme product and polymer-plural enzyme product.

7. Composition of claim 1, wherein all polymer-enzyme products employed contain as the enzyme moiety or moieties thereof enzymes entirely of microbiological origin.

8. Composition of claim 1, in the form of chewing gum.

9. Composition of claim 1, in the form of gargle.

10. A composition as defined in claim 1 wherein the polymer is an ethylene/maleic anhydride copolymer.

11. A composition as defined in claim 10 wherein the ethylene/maleic anhydride copolymer is derived from ethylene and maleic anhydride in approximately equimolar proportions.

12. A method of enzymatically treating the oral cavity for oral hygiene purposes which comprises the step of contacting therewith an enzymatically effective amount of a polymer-enzyme product having protease activity within the relatively neutral pH range of the oral cavity and maintaining such contact for a period sufficient to enable said product to exert its enzymatic activity on substrates therein, said polymer enzyme product being one in which neutral protease and dextranase are covalently bound to a polymer (a) comprising chains of carboxylic acid or carboxylic acid anhydride units, or (b) comprising units of carboxylic acid or carboxylic acid anhydride groups separated by carbon chains of at least one and not more than four carbon atoms, said carbon chains being part of a unit which contains a maximum of 18 carbon atoms, wherein the polymer is selected from the group consisting of ethylene/maleic anhydride copolymer, polyacrylic acid anhydride and divinyl ether/maleic anhydride copolymer, said enzymatically effective amount being sufficient to digest a substrate in the oral cavity.

13. Process of claim 12 wherein the polymer-enzyme product is employed in the form of a dentifrice.

14. Process of claim 12 wherein the polymer-enzyme product is employed in the form of a fluid mouthwash.

15. Process of claim 12 wherein the polymer-enzyme product is employed in water-soluble form.

16. Process of claim 12 wherein the polymer-enzyme product is employed in water-soluble form.

17. Process of claim 12 wherein the polymer-enzyme product is employed in the form of chewing gum.

18. Process of claim 12 wherein the polymer-enzymatic product is employed in the form of gargle 19. A method as defined in claim 12 wherein the polymer is an ethylene/maleic anhydride copolymer.

20. A composition as defined in claim 19 wherein the ethylene/maleic anhydride copolymer is derived from ethylene and maleic anhydride in approximately equimolar proportions.

References Cited

UNITED STATES PATENTS

| | | | |
|---|---|---|---|
| 3,562,385 | 2/1971 | Block et al. | 424—50 |
| 3,590,121 | 6/1971 | Schiff et al. | 424—50 |
| 3,616,229 | 10/1971 | Wildi et al. | 195—Dig. 11 |

FOREIGN PATENTS

| | | | |
|---|---|---|---|
| 1,504,155 | 10/1967 | France | 424—49 |
| 1,272,272 | 8/1961 | France | 424—50 |
| 4,675 | 12/1966 | France | 424—50 |
| 1,033,229 | 6/1966 | Great Britain | 424—50 |
| 1,166,627 | 10/1969 | Great Britain | 424—49 |
| 1,166,628 | 10/1969 | Great Britain | 424—49 |
| 1,108,533 | 4/1968 | Great Britain | 424—94 |

OTHER REFERENCES

Derwent Farmdoc. No. 35,976, citing Belg. Pat. No. 718,645, pub. January 1969.

Molle: J. S. Cal. State Dental Assoc., vol. 35, pp. 391–5, September 1967.

Harrisson et al.: J. Periodontology, vol. 34, pp. 34–37, 1963.

McCon et al.: J. Biol. Chem., vol. 239, pp. 3706–3715, November 1964.

Ong et al.: J. Biol. Chem., vol. 241, pp. 5661–5666, December 1966.

Bar-Eli: J. Biol. Chem., vol. 238, pp. 1690–1698, May 1963.

Levin et al.: Biochemistry, vol. 3, pp. 1905–1913, December 1964.

RICHARD L. HUFF, Primary Examiner

U.S. Cl. X.R.

424—50, 81, 94

UNITED STATES PATENT OFFICE
CERTIFICATE OF CORRECTION

Patent No. 3,751,561          Dated August 7, 1973

Inventor(s) Bernard S. Wildi, et al.

It is certified that error appears in the above-identified patent and that said Letters Patent are hereby corrected as shown below:

Column 1, line 62:
"carbohydrates" should be ---carbohydraces---.

Column 5, line 42:
"filed" should be ---field---.

Column 6, line 43:
"Whene" should be ---Where---.

Column 6, line 58:
"beside" should be ---besides---.

Column 7, line 7:
"carboidiimidazoles" should be ---carbodiimidazoles---.

Column 7, line 40:
"polymer dextranase" should be ---polymer-dextranase---.

Column 8, line 36:
"protease" should be ---proteases---.

Colum 8, line 69:
"of protease" should be ---of proteases---.

Column 10, line 15:
"lower alkoxyalkylene" should be ---lower-alkoxyalkylene---.

UNITED STATES PATENT OFFICE
CERTIFICATE OF CORRECTION

Patent No. 3,751,561      Dated August 7, 1973

Inventor(s) Bernard S. Wildi, et al.

It is certified that error appears in the above-identified patent and that said Letters Patent are hereby corrected as shown below:

Column 11, line 28:
"and other" should be ---and another---.

Column 12, line 13:
"polymers are those" should be ---polymers are commercially available. Particularly valuable copolymers are those---.

Column 12, line 31:
"water-insoluble," should be ---water-insoluble",---.

Column 12, line 43:
"water-soluble," should be ---water-soluble",---.

Column 12, line 56:
"actvity" should be ---activity---.

Column 15, line 41:
"inslouble" should be ---insoluble---.

Column 16, line 33:
"on insoluble" should be ---on the insoluble---.

Column 16, line 47:
"termendously" should be ---tremendously---.

Column 19, line 23:
"enzyme" should be ---enzymes---.

UNITED STATES PATENT OFFICE
CERTIFICATE OF CORRECTION page 3

Patent No. 3,751,561          Dated August 7, 1973

Inventor(s)    Bernard S. Wildi, et al.

It is certified that error appears in the above-identified patent and that said Letters Patent are hereby corrected as shown below:

Column 20, line 34:
"is packaged" should be ---in packaged---.

Column 20, line 69:
"Gycerine" should be ---Glycerine---.

Column 21, line 43:
"formulations" should be ---formulation---.

Column 23, line 37:
"with flavors" should be ---with various flavors---.

Column 23, line 73:
"2% by" should be ---2%, by---.

Column 23, line 74:
"products" should be ---product---.

Column 24, line 31:
"being that" should be ---being in that---.

Column 24, line 37:
"used" should be ---use---.

Column 24, lines 38 and 39:
"polymer enzyme" should be ---polymer-enzyme---.

Column 24, line 57:
"of the polymer" should be ---of polymer---.

UNITED STATES PATENT OFFICE
CERTIFICATE OF CORRECTION page 4

Patent No. 3,751,561　　　　　Dated August 7, 1973

Inventor(s) Bernard S. Wildi, et al.

It is certified that error appears in the above-identified patent and that said Letters Patent are hereby corrected as shown below:

Column 26, line 10, claim 16:
"water-soluble" should be ---water-insoluble---.

Column 26, line 13, claim 18:
"polymer-enzymatic" should be ---polymer-enzyme---.

Column 26, line 14, claim 18:
"gargle" should be ---gargle.---.

Signed and sealed this 23rd day of July 1974.

(SEAL)
Attest:

McCOY M. GIBSON, JR.　　　　　　C. MARSHALL DANN
Attesting Officer　　　　　　　　Commissioner of Patents